United States Patent [19]
Showalter

[11] Patent Number: 6,101,897
[45] Date of Patent: Aug. 15, 2000

[54] TRANSFER CASE CLUTCH CONFIGURATION

[75] Inventor: Dan J. Showalter, Plymouth, Mich.

[73] Assignee: BorgWarner Inc., Troy, Mich.

[21] Appl. No.: 09/384,957

[22] Filed: Aug. 27, 1999

[51] Int. Cl.[7] .............................. F16D 13/54; F16D 27/12
[52] U.S. Cl. ....................................... 74/665 GE; 192/35
[58] Field of Search ........................... 192/35, 48.2, 3.56;
74/665 G, 665 GA, 665 GE

[56] References Cited

U.S. PATENT DOCUMENTS

| | | | |
|---|---|---|---|
| 4,690,015 | 9/1987 | Nagano et al. ..................... | 74/665 GE |
| 4,718,303 | 1/1988 | Fogelberg .............................. | 74/710.5 |
| 4,718,516 | 1/1988 | Ozaki et al. ............................ | 180/233 |
| 4,846,298 | 7/1989 | Naito ..................................... | 180/233 |
| 5,002,147 | 3/1991 | Tezuka et al. .......................... | 180/197 |
| 5,010,974 | 4/1991 | Matsuda ................................. | 180/233 |
| 5,168,956 | 12/1992 | Namioka ............................... | 180/248 |
| 5,275,252 | 1/1994 | Sperduti et al. ....................... | 180/197 |
| 5,334,116 | 8/1994 | Baxter, Jr. ............................. | 475/204 |
| 5,335,746 | 8/1994 | Betz ...................................... | 180/248 |
| 5,407,024 | 4/1995 | Watson et al. ......................... | 180/248 |
| 5,584,776 | 12/1996 | Weilant et al. ........................ | 475/213 |
| 5,647,147 | 7/1997 | Tobita et al. ........................... | 475/295 |
| 5,735,767 | 4/1998 | Forsyth .................................. | 475/269 |
| 5,943,911 | 8/1999 | Beckerman ............................ | 192/35 |

*Primary Examiner*—Dirk Wright
*Attorney, Agent, or Firm*—Brinks, Hofer, Gilson & Lione; Greg Dziegielewski

[57] ABSTRACT

An electromagnetic clutch assembly for motor vehicle transfer cases and the like includes an electromagnetic operator and a disc pack clutch assembly disposed on opposite sides of a chain drive sprocket. The clutch pack assembly is driven by a primary output shaft of the transfer case and transfers energy to the chain drive sprocket and thence to a secondary output shaft. The disc pack clutch assembly is actuated by the clutch operator which generates a compressive force which is transferred to the clutch pack assembly by a plurality of axially disposed pins received within complementary passageways in the chain drive sprocket. A multiple position clutch collar selectively: allows the clutch pack to free-wheel by fully disengaging it from the primary output shaft, couples the input of the disc pack clutch assembly to the primary output shaft to permit on-demand clutch operation and torque distribution and couples or locks the input and output members of the disc pack clutch assembly together and provides nominally equal torque delivery to the primary output shaft and the chain drive sprocket and secondary output shaft.

20 Claims, 4 Drawing Sheets

TRANSFER CASE CLUTCH CONFIGURATION

BACKGROUND OF THE INVENTION

The invention relates generally to electromagnetic clutch assemblies for transfer cases and the like and more specifically to a transfer case clutch assembly wherein a clutch pack assembly having an ancillary locking clutch and an electromagnetic operator are disposed on opposite sides of a chain drive sprocket.

Contemporary transfer case clutches represent numerous engineering and operational approaches. A fundamental distinction between many of these approaches is whether the operator is hydraulically or electrically powered. Hydraulically operated clutches are disclosed in, for example, U.S. Pat. No. 4,846,298 to Naito, 5,002,147 to Tezuka, et al. and U.S. Pat. No. 5,010,974 to Matsuda. Electric or electromagnetic clutch operators are disclosed in, for example, U.S. Pat. Nos. 4,718,303, 5,407,024 and 5,584,776. These patents all disclose various transfer case, clutch and control configurations adapted to provide performance which addresses various operational parameters. Other configurations address other operational features and parameters.

As the designs and configurations for transfer case clutches have progressed, certain operational features and parameters have increased in importance and others have decreased. One such feature of increasing importance is the capability to couple or lock the primary drive line and the secondary drive line through the transfer case. In extreme operating conditions, particularly in low gear, direct, i.e., non-modulated, equal torque delivery to the primary and secondary drive lines provides desirable and predictable control, driveability and traction. Such a coupling or locking device also allows the modulating clutch and actuator to be de-energized, reducing wear and heat generation in the transfer case during operating conditions where both could be significant.

A relatively constant goal over time has been improved fuel economy. Within the context of transfer cases, improved fuel economy involves reduction of drag, primarily in two-wheel drive operation by reducing any frictional coupling between the operating and non-operating components. The present invention is directed to both of these goals.

SUMMARY OF THE INVENTION

An electromagnetic clutch assembly for motor vehicle transfer cases and the like includes an electromagnetic operator and a disc pack clutch assembly disposed on opposite sides of a chain drive sprocket. The clutch pack assembly is driven by a primary output shaft of the transfer case and transfers energy to the chain drive sprocket and thence to a secondary output shaft. The disc pack clutch assembly is actuated by the clutch operator which generates a compressive force which is transferred to the clutch pack assembly by a plurality of axially disposed pins received within complementary passageways in the chain drive sprocket. A multiple position clutch collar selectively: allows the clutch pack to free wheel by fully disengaging it from the primary output shaft, couples the clutch pack input to the primary output shaft to permit on-demand clutch operation and torque distribution and couples or locks the input and output members of the disc pack clutch assembly together to provide nominally equal torque delivery to the primary output shaft and the chain drive sprocket and secondary output shaft.

Thus it is an object of the present invention to provide a clutch for transfer cases and the like wherein a disc pack clutch assembly and clutch operator are disposed on opposite sides of a chain drive sprocket.

It is a further object of the present invention to provide a clutch assembly for transfer cases and the like having an electric operator which actuates a clutch pack assembly through a plurality of parallel, axially disposed pins.

It is a still further object of the present invention to provide a clutch assembly for transfer cases having a disc pack assembly which may free wheel on the output shaft.

It is a still further object of the present invention to provide a clutch for transfer cases and the like having reduced drag in its deactivated position.

It is a still further object of the present invention to provide a clutch for transfer cases and the like having a locking clutch which directly couples the primary and secondary drive lines.

It is a still further object of the present invention to provide a clutch assembly for transfer cases and the like having a locking clutch which is disposed in mechanical parallel with a modulating clutch, both clutches operably disposed between the primary and secondary drive lines.

Further objects and advantages of the present invention will become apparent by reference to the following description of the preferred embodiment and appended drawings wherein like reference numbers refer to the same component, element or feature.

DESCRIPTION OF THE PREFERRED EMBODIMENT

Figure 1:
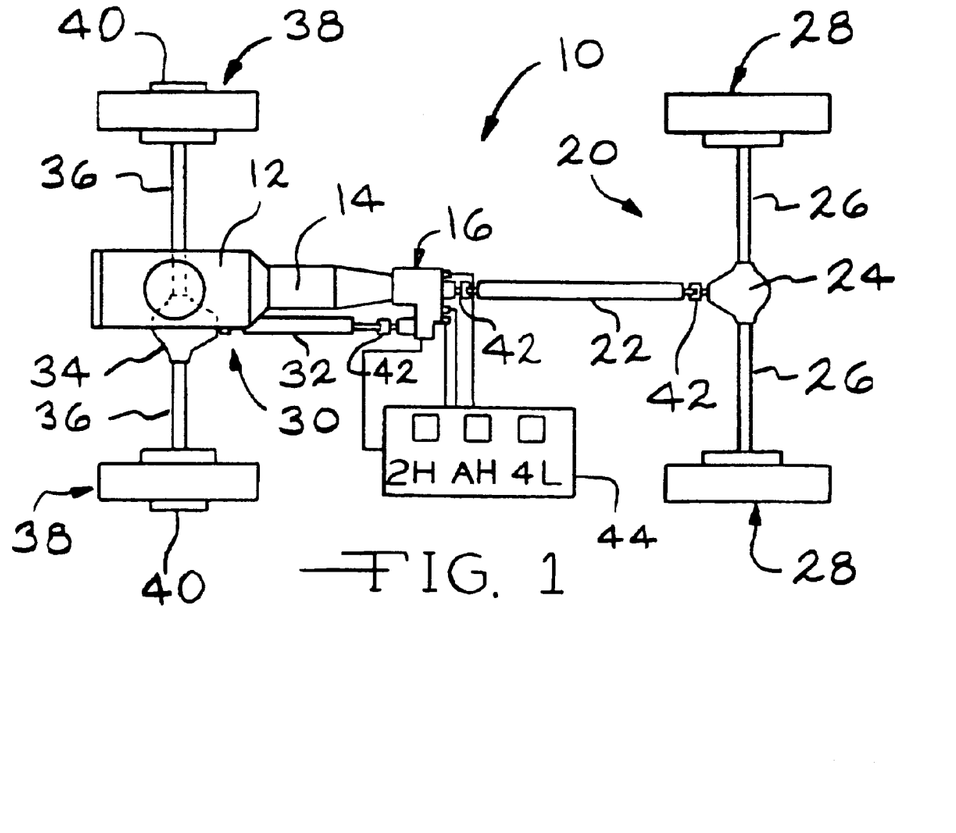
FIG. 1 is a diagrammatic view of a motor vehicle drive train incorporating a transfer case and clutch assembly according to the present invention.

Referring now to FIG. 1, an on demand vehicle drive system is illustrated and generally designated by the reference numeral 10. The on demand system 10 is incorporated into a vehicle having a prime mover, such an internal combustion engine 12, which drives a conventional transmission 14 which may either be a manual transmission with a clutch or an automatic transmission. The output of the transmission 14 drives a transfer case assembly 16. In turn, the transfer case assembly 16 is operably coupled to and drives a rear or primary drive line 20 having a rear or primary drive shaft 22 which is operably coupled to and drives a rear or primary differential 24. The rear or primary differential 24 drives a pair of aligned rear or primary axles 26 which are coupled to rear or primary tire and wheel assemblies 28.

The transfer case assembly 16 also provides torque to a front or secondary drive line 30. The secondary drive line 30 includes a front or secondary drive shaft 32 which in turn drives the front or secondary differential 34. The secondary differential 34 operates in conventional fashion and provide drive torque through a pair of aligned front or secondary axles 36. A pair of front or secondary tire and wheel assemblies 38 are disposed at the front of the vehicle. A pair of locking hubs 40 are operably disposed between a respective one of the front or secondary axles 36 and the front tire and wheel assemblies 38. The locking hubs 40 may be either remotely operated and thus include electrical or pneumatic operators or may be manually activated. Alternatively, front axle disconnects (not illustrated) may be housed within the front or secondary differential 34 and the axle disconnects may be activated or deactivated to couple or uncouple the secondary axles 36 from the output of the secondary differential 34. A plurality of universal joints 42 are preferably disposed at various locations to accommodate static and dynamic misalignment between the drive shafts 22 and 32 and other drive line components described above.

The system 10 also include a driver input control 44 having a switch or push buttons which receive input from the vehicle operator and provide control signals to the transfer case assembly 16 as will be more fully described below.

It should be understood that the designations "primary" and "secondary" appearing both above and below refer to drive lines and drive line components in the system 10 which are primarily and secondarily intended to propel a vehicle. That is, in the system 10 illustrated, the inventor describes a vehicle which is commonly referred to as a rear wheel drive vehicle in which the rear tire and wheel assemblies 28 primarily from both a time and torque standpoint propel the vehicle. The secondary drive line 30 and the front or secondary tire and wheel assemblies 38 typically function intermittently, that is, on an as needed basis, to provide improved vehicle performance and stability in adverse driving conditions.

It should be understood, however, that the operating components described herein are fully and equally usable and suitable for a vehicle wherein the primary drive line and tires are disposed at the front of the vehicle, that is, a vehicle commonly referred to as a front wheel drive vehicle, and the secondary drive line and tires are located toward the rear of the vehicle.

Figure 2:
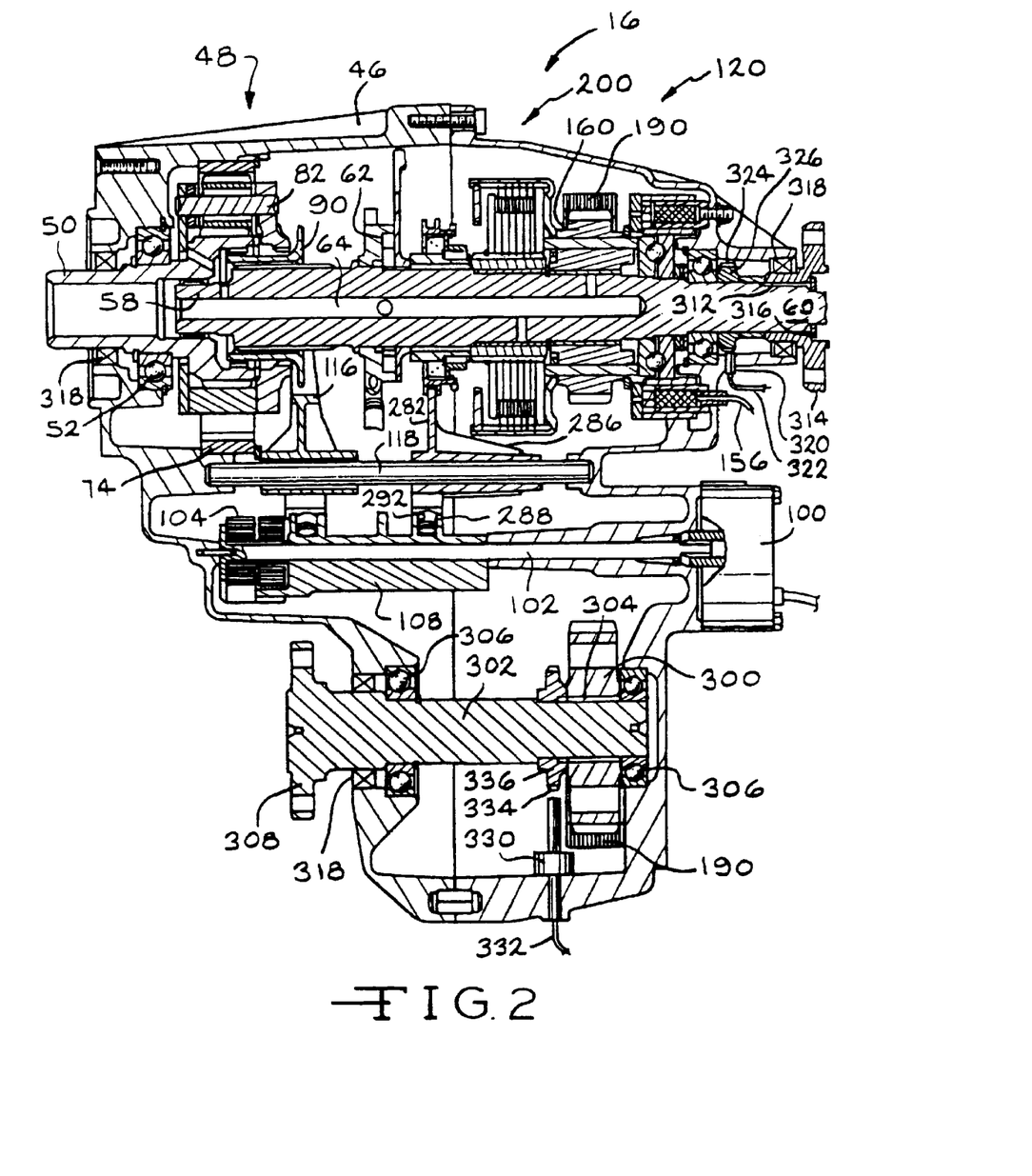
FIG. 2 is a full, sectional view of a transfer case incorporating a clutch assembly according to the present invention.
Figure 3:
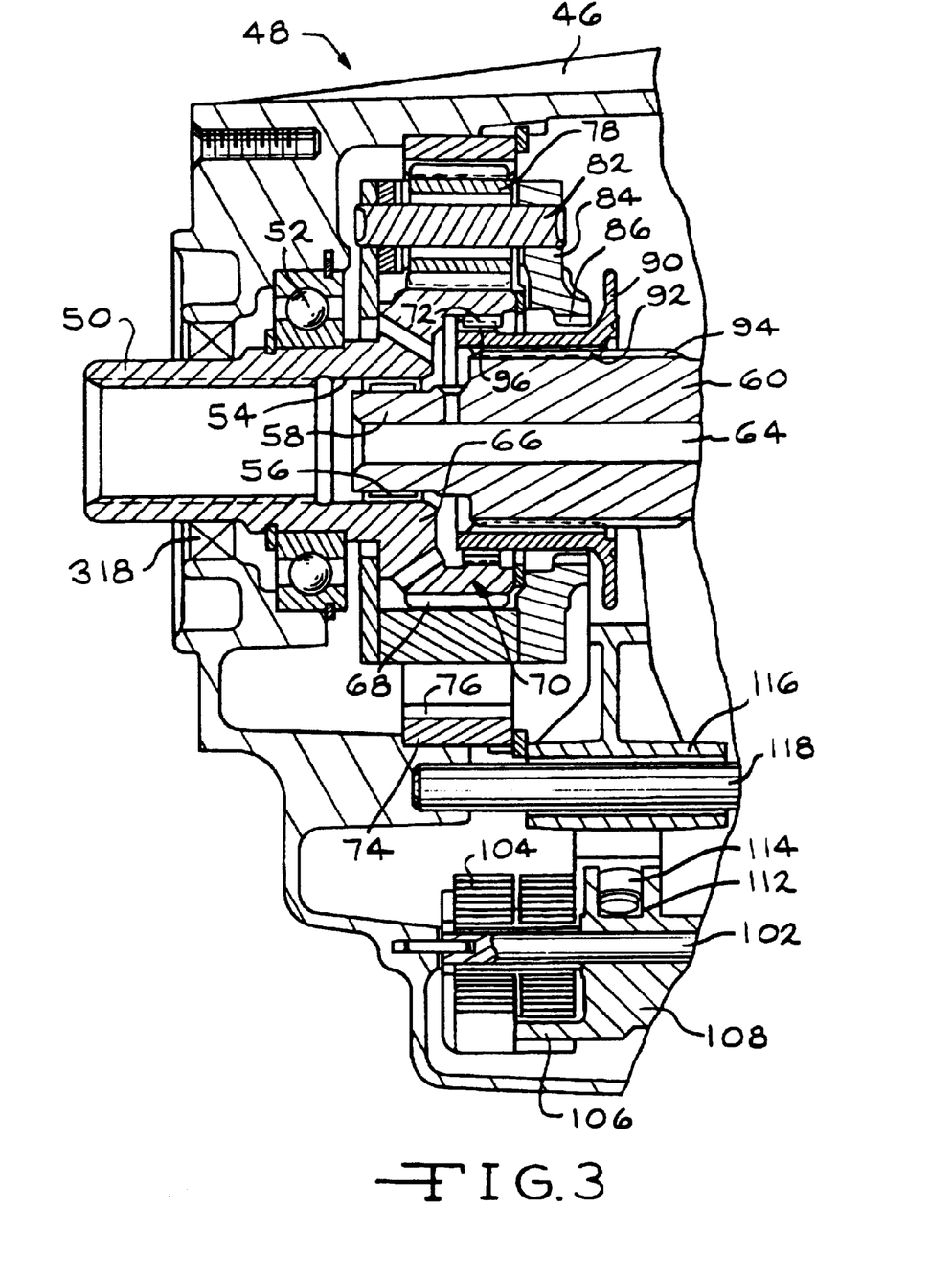
FIG. 3 is an enlarged, sectional view of a portion of a transfer case and speed reducing assembly according to the present invention.

Referring now to FIGS. 2 and 3, the transfer case assembly 16 includes a multiple part, typically cast, housing 46 having various openings for shafts and fasteners and various mounting surfaces and grooves for oil seals, bearings, seal retaining rings and other internal components as will be readily appreciated. The transfer case assembly 16 also includes a planetary gear assembly 48 which is driven by an input shaft 50 rotatably supported within the transfer case assembly 16 by an anti-friction bearing such as a ball bearing assembly 52. The input shaft 50 is coupled to and driven by the output of the transmission 14. The input shaft 50 defines a re-entrant bore 54 which receives a roller bearing assembly 56. The roller bearing assembly 56, in turn, receives and rotatably supports the forward terminus 58 of a primary (rear) output shaft 60. A gerotor pump 62 is disposed about and is driven by the primary output shaft 60, providing lubricating fluid under pressure to a passageway 64 which extends axially within the output shaft 60 and distributes lubricating and cooling fluid to components of the transfer case assembly 16.

In the planetary gear assembly 48, the input shaft 50 defines an enlarged, bell-shaped region 66 having a plurality of external gear teeth 68 which define a sun gear 70. On the inner surface of the bell-shaped region 66 of the input shaft 50 are a plurality of female splines or gear teeth 72. Axially aligned with the sun gear teeth 68 is a ring gear 74 having a plurality of internal gear teeth 76. A plurality of pinion gears 78, one of which is illustrated in FIGS. 2 and 3 are rotatably received upon a like plurality of stub shafts 82 which are fixedly mounted within a carrier 84. The carrier 84 includes a plurality of inwardly directed female splines or gear teeth 86 on a surface generally axially adjacent but spaced from the internal splines or gear teeth 72 defined by the input shaft 50. The planetary gear assembly 48 is more fully described in co-owned U.S. Pat. No. 4,440,042 which is herein incorporated by reference.

An axially sliding, that is, dog type, clutch 90 is received about the primary output shaft 60. The dog clutch 90 defines an inwardly directed plurality of female splines or gear teeth 92 which are complementary to and mate with a like plurality of external or male splines or gear teeth 94 disposed on output shaft 60. The dog clutch 90 thus rotates with the output shaft 60 but may slide axially therealong. The dog clutch 90 includes a region of external or male splines or gear teeth 96 which are complementary to the teeth or splines 72 and 86 disposed on the input shaft 50 and the planetary gear carrier 84, respectively.

The dog clutch 90 is axially translatable between a first, forward position wherein the external teeth 96 couple with the gear teeth 72 and provide direct drive between the input shaft 50 and the primary output shaft 60 and a second, rearward position, to the right in FIGS. 2 and 3, wherein the dog clutch 90 engages the gear teeth 86 on the carrier 84 and provides a reduced speed drive between the input shaft 50 and the primary output shaft 60 in accordance with the gear ratio provided by the planetary gear assembly 48. The dog clutch 90 may also be moved to a third, neutral position mid-way between the forward, direct drive position and the rearward, reduced speed drive position. In this middle position, the input shaft 50 is disconnected from the primary output shaft 60 and no torque is transferred therebetween.

The position of the dog clutch 90 is commanded by an electric shift control motor 100. The electric shift control motor 100 rotates a drive shaft 102. The drive shaft 102 is suitably supported for rotation within the housing 46 of the transfer case assembly 16. The position of the drive shaft 102 may be monitored and read by an encoder assembly (not illustrated) which provides information about the current position of the drive shaft 102 and the dog clutch 90 to associated control devices.

The drive shaft 102 terminates in and drives a spring assembly 104. The spring assembly 104 is wrapped about the drive shaft 102 and is also engaged by an arm 106 which extends axially from a cylindrical cam 108. The spring assembly 104 functions as a resilient coupling between the drive shaft 102 and the cylindrical cam 108 to absorb lag between the movement commanded by the drive motor 100 and the driven components so that the shift motor 100 is allowed to reach its final requested position. The spring assembly 104 allows smooth and quiet response to a requested repositioning of the dog clutch 90 in situations where the splines or gear teeth 96 of the dog clutch 90 do not instantaneously engage the internal splines or gear teeth 72 of the input shaft 50 or the internal splines or gear teeth 86 of the carrier 84. When relative rotation of the dog clutch 90 allows engagement of the aforementioned gear teeth, potential energy stored in the spring assembly 104 rotates the cylindrical cam 108 to its requested position, thus completing the shift.

The cylindrical cam 108 defines a generally helical track 112 which preferably extends approximately 270° about the cylindrical cam 108. The helical track 112 receives a pin or cam follower 114 which is coupled to and translates a first fork assembly 116. The first fork assembly 116 is supported for bi-directional translation upon a fixed shaft 118 and engages the periphery of the dog clutch 90. Rotation of the shaft 102 axially repositions the cam follower 114 and axially repositions the dog clutch 90 in one of the three positions described above.

It will be appreciated that the planetary gear assembly 48 including the mechanism of the dog clutch 90 which provides dual range, i.e., high and low speed, capability to the transfer case assembly 16 is optional and that the vehicle drive system 10 is fully functional as a single speed drive system and may be utilized without these components and the dual speed range capability provided thereby.

Figure 4:
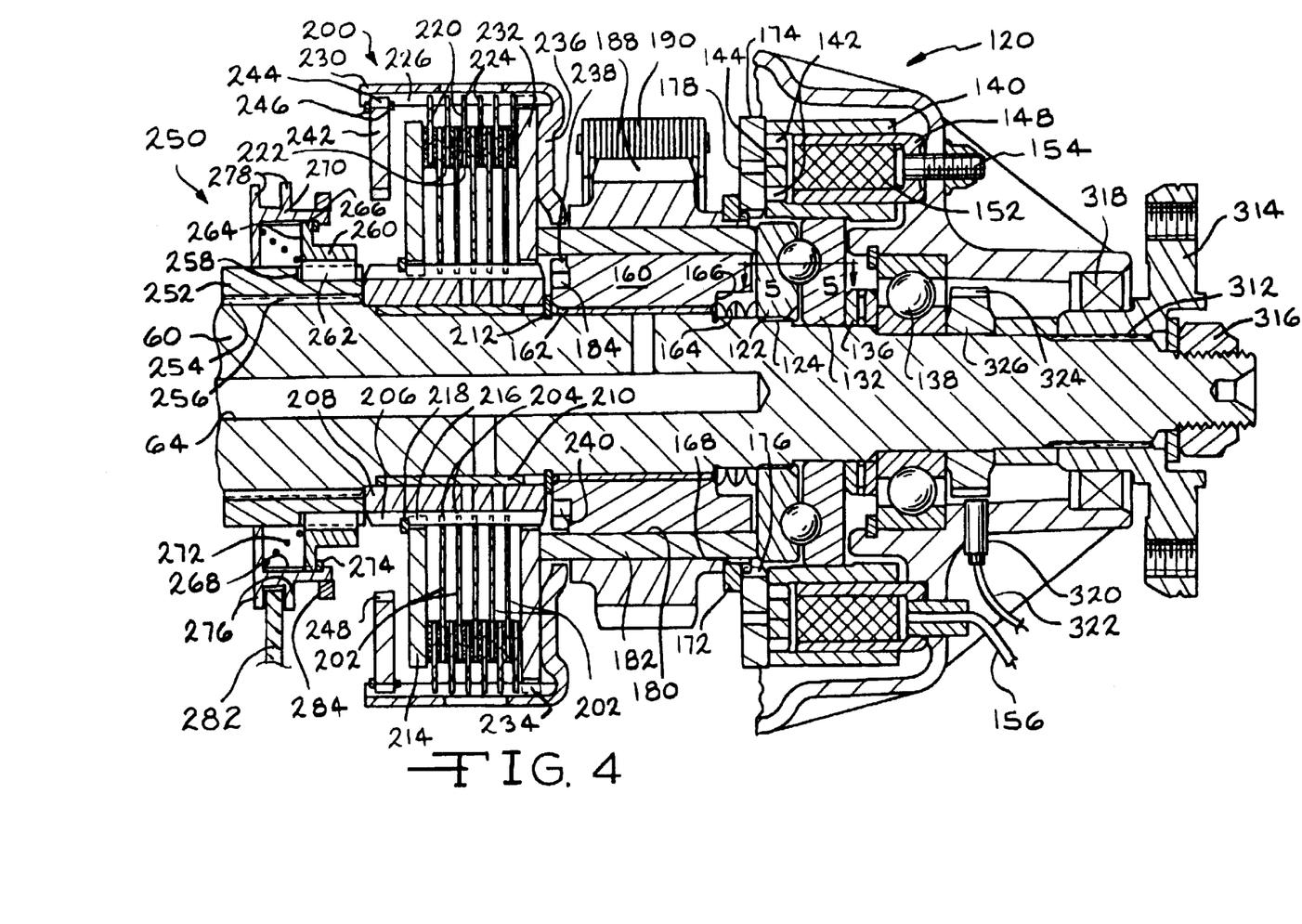
FIG. 4 is an enlarged, sectional view of portion of a transfer case incorporating a clutch assembly according to the present invention.
Figure 5:
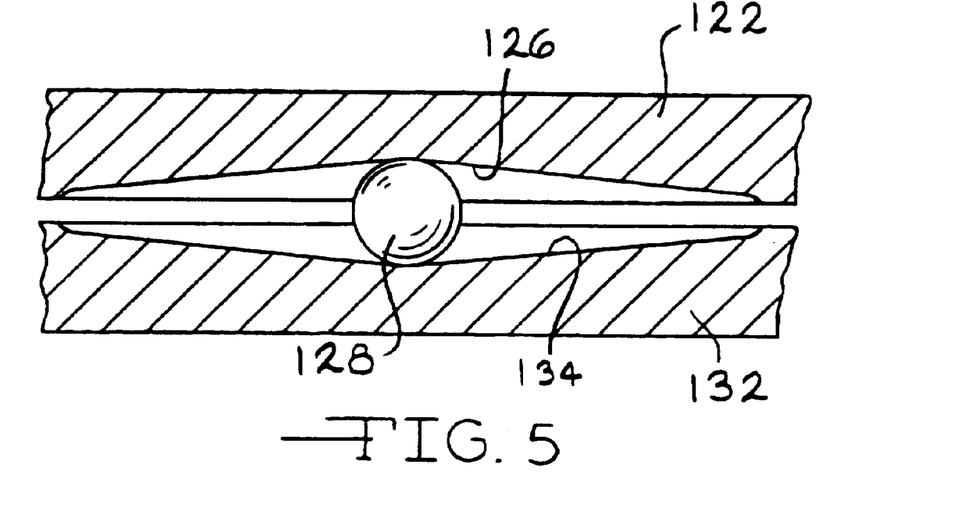
FIG. 5 is a flat pattern development of a clutch ball and associated recesses of a clutch assembly according to the present invention taken along line 5—5 of FIG. 4.

Referring now to FIGS. 2, 4 and 5, the transfer case assembly 16 also includes a fully disconnectable, electromagnetically actuated clutch assembly 120. The clutch assembly 120 is disposed about the primary output shaft 60 and includes a circular drive member 122 coupled to the output shaft 60 through a splined interconnection 124. The circular drive member 122 includes a plurality of circumferentially spaced apart recesses 126 in the shape of an oblique section of a helical torus, as illustrated in FIG. 5. Each of the recesses 126 receives one of a like plurality of load transferring balls 128.

A circular driven member 132 is disposed adjacent the circular drive member 122 and includes a like plurality of opposed recesses 134 defining the same shape as the recesses 126. The oblique side walls of the recesses 126 and 134 function as ramps or cams and cooperate with the balls 128 to drive the circular members 122 and 132 apart in response to relative rotation therebetween. It will be appreciated that the recesses 126 and 134 and the load transferring balls 128 may be replaced with other analogous mechanical elements which cause axial displacement of the circular members 122 and 132 in response to relative rotation therebetween. For example, tapered rollers disposed in complementarily configured conical helices may be utilized. The axial position of the circular drive member 132 is maintained in one direction against the forces generated by the load transferring balls 128 by a thrust bearing assembly 136 which, in turn, engages a portion of a ball bearing assembly 138 which rotatably supports the primary output shaft 60 adjacent the rear of the transfer case assembly 16.

The circular driven member 132 extends radially outwardly and is secured to a soft iron rotor 140. The rotor 140 includes a plurality of discontinuous, arcuate slots 142 formed in a radially and circumferentially extending end wall 144 of the rotor 140. The rotor 140 is U-shaped in cross-section and partially receives and rotates about a coil housing 148 containing an electromagnetic coil 152. The electromagnetic coil 152 is secured to the housing 46 by a plurality of threaded studs and fasteners 154.

The electromagnetic coil 152 is preferably provided with electrical energy from a pulse width modulation (PWM) control through an electrical conductor 156. The pulse width modulation scheme increases or decreases the average current to the electromagnetic coil 152 and the torque throughput of the electromagnetic clutch assembly 120 by increasing or decreasing the on-time (duty cycle) of the drive signal. It will be appreciated that other modulating control techniques may be utilized to achieve engagement and disengagement of the electromagnetic clutch assembly 120.

A chain drive sprocket 160 is freely rotatably disposed about the primary output shaft 60. A journal sleeve or cylindrical bushing 162 may be disposed between the chain drive sprocket 160 and the primary output shaft 60, if desired. A plurality of wave washers or Belleville springs 164 abut a shoulder 166 of the chain drive sprocket 160 and bias the circular drive member 122 toward the circular driven member 132.

On an outer surface of the chain drive sprocket 160 generally adjacent the rotor 140 is a first plurality of male or external splines or gear teeth 168 which receive a locating collar 172 which axially positions and locates an armature 174. The armature 174 includes internal or female splines or gear teeth 176 which are complementary to and mate with the male splines or gear teeth 168 on the chain drive sprocket 160. The armature 174 thus rotates with the chain drive sprocket 160. The armature 174 is disposed generally adjacent the end wall 144 of the rotor 140 and includes a discontinuous arcuate slot 178 which is disposed generally radially intermediate the slots 142 in the end wall 144 of the rotor 140. The slots 142 and 178, and more accurately the remaining material of the rotor 140 and the armature 174, define a sinuous flux path which increases magnetic attraction between these components and improves operation of the electromagnetic clutch assembly 120.

The chain drive sprocket 160 also includes at least three axial passageways 180 which each receive an axially disposed pin or rod 182. It should be noted that preferably no fewer than three axial passageways 180 and pins 182 are utilized. The chain drive sprocket 160 also includes a second plurality of male or external splines or gear teeth 184 on an end generally opposite the first plurality of male splines 168. Finally, on an intermediate region of the chain drive sprocket 160 are disposed chain drive teeth 188 which drivingly engage a drive chain 190.

The electromagnetic clutch assembly 120 also includes a friction disc pack assembly 200. The friction disc pack assembly 200 includes pluralities of interleaved friction plates or discs. A first plurality of smaller or inner clutch discs 202 include internal or female splines 204 which are complementary to and engage external or male splines 206 on an annular drive collar 208 freely rotatably disposed about the primary output shaft 60. A journal sleeve or cylindrical bushing 210 may be disposed between the annular drive collar 208 and the primary output shaft 60 and a flat, friction reducing washer 212 is preferably disposed between the annular drive collar 208 and the chain drive sprocket 160. A circular reaction plate 214 includes female or internal splines 216 complementary to the splines 206 on the annular drive collar 208, rotates therewith and is axially positioned by a snap ring 218.

A second plurality of larger, outer clutch discs 220 are interleaved with the first plurality of clutch discs 202 and both include appropriate abutting regions of friction clutch material 222. The second plurality of clutch discs 220 includes male or exterior splines 224 which are complementary to and engage internal or female splines 226 on the inside surface of a clutch bell housing 230. A circular apply plate 232 includes male or external splines 234 which engage the internal splines 226 on the bell housing 230 and rotates therewith. A radially inwardly extending end wall 236 of the bell housing 230 includes at least three openings 238 which receive the pins or rods 182 which engage the circular apply plate 232. The end wall 236 of the bell housing 230 terminates in a plurality of internal or female splines or gear teeth 240 which engage the second plurality of external splines or gear teeth 184 on the chain drive sprocket 160. Thus, the second plurality of clutch discs 220, the bell housing 230 and the circular apply plate 232 all rotate with the chain drive sprocket 160.

Also splined to the bell housing 230 is a circular drive plate 242 having external or male splines 244 which are complementary to the internal splines 226 in the bell housing 230. A pair of snap rings 246 retains the circular drive plate 242 in the bell housing 230. The circular drive plate 242 also includes internal or female splines or gear teeth 248 about its inner diameter.

Providing electrical energy to the electromagnetic coil 152 causes magnetic attraction of the rotor 140 with the armature 174. This magnetic attraction results in frictional contact of the armature 174 with the rotor 140. When the primary output shaft 60 is turning at a different speed than the armature 174, this frictional contact results in a frictional torque being transferred from the output shaft 60, through the circular drive member 122, through the load transferring balls 128 and to the circular driven member 132. The resulting torque and drag causes the balls 128 to ride up the ramps of the recesses 126 and 134, causing axial displacement of the circular drive member 122. Axial displacement of the circular drive member 122 translates the pins 182 and the apply plate 232 axially toward the disc pack assembly 200 compressing it and transferring torque through the disc pack assembly 200.

When the supply of electrical energy to the electromagnetic coil 152 is terminated, the compression springs 164 provide a restoring force which biases the circular drive member 122 toward the circular driven member 132 and returns the load transferring balls 128 to center positions in the circular recesses 126 and 134 to provide maximum clearance and minimum friction between the components of the electromagnetic clutch assembly 120.

An important design consideration of the components of the electromagnetic clutch assembly 120 is that their geometry, such as the ramp angles of the recesses 126 and 134, the spring rate of the compression springs 164 and the clearances in the disc pack assembly 200 ensure that the electromagnetic clutch assembly 120 is neither self-engaging nor self-locking. The electromagnetic clutch assembly 120 must not self-engage but rather must be capable of controlled, proportional engagement of the clutch discs 202 and 220 and torque transfer in direct, proportional response to the control input.

A drive clutch assembly 250 is disposed adjacent the disc pack assembly 200. The drive clutch assembly 250 includes a drive hub 252 having female or internal splines or gear teeth 254 which engage and are driven by complementarily configured male or external splines or gear teeth 256 on the primary output shaft 60. On the outer surface of the drive hub 252 is a region of male splines or gear teeth 258 which are in all respects identical to the male splines or gear teeth 206 on the annular drive collar 208 of the disc pack assembly 200. A clutch collar 260 having internal splines or gear teeth 262 which engage the male splines or gear teeth 258 is received upon the drive hub 252. The clutch collar 260 includes a circular, radially extending flange 264. The periphery of the flange 264 includes male splines or gear teeth 266 which engage complementary female splines or gear teeth 268 on a clutch operating collar 270.

The clutch operating collar 270 is concentrically disposed about the drive hub 252 and rotates therewith by virtue of the multiple splined interconnections. A compression spring 272 biases the clutch operating collar 270 and the clutch collar 260 to the positions illustrated in FIG. 4. In operation, the compression spring 272 ensures smooth engagement of the clutch collar 260 with the annular drive collar 208 by allowing proper alignment of the gear teeth or splines 206 and 258 before the clutch collar 260 translates and engages. A snap ring 274 seated in the clutch operating collar 270 limits the relative axial motion of these components. The clutch operating collar 270 also includes a pair of spaced apart peripheral flanges 276 which define a slot 278 which receives a second shift fork 282 and a plurality of male or external splines or gear teeth 284 which are in all respects complementary to the internal splines or gear teeth 248 on the circular drive plate 242.

The second shift fork 282 extends radially from a second fork assembly 286 which is slidably disposed upon the fixed shaft 118. The second fork assembly 286 includes a pin or cam follower 288 which is received within a generally helical track 292 in the cylindrical cam 108. Preferably the helical track 292 extends approximately 270° about the cylindrical cam 108. Alternatively, the helical track 292 may be defined by a second cylindrical cam. Rotation of the shift control motor 100 and the drive shaft 102, in addition to positioning the first fork assembly 116, thus also positions the second fork assembly 286 and the clutch operating collar 270.

The clutch operating collar 270 and the clutch collar 260 may be positioned in one of three operating positions. In a first position illustrated in FIG. 4, the clutch collar 260 and the clutch operating collar 270 are disengaged from components of the disc pack assembly 200. There is thus no operating or driving connection between the primary output shaft 60 and the disc pack assembly 200. This operating mode significantly reduces drag and friction between the components of the disc pack assembly 200 and improves gas mileage of the vehicle as well as reduces wear.

When the shift control motor 100 is energized, the second fork assembly 286 may be moved to a center position such that the clutch collar 260 and specifically the internal splines or gear teeth 262 engage the external splines or gear teeth 206 on the annular drive collar 208. It will be appreciated that the compression spring 272 facilitates smooth engagement of the gear teeth or splines 206 and 258, as noted above. In this position, torque is provided from the primary output shaft 60 to the annular drive collar 208. In this operating mode, the electromagnetic clutch assembly 120 may be activated and modulated as described above to provide controlled and adaptive torque delivery and distribution to and between the primary drive line 20 and the secondary drive line 30. Pre-shift or clutch engagement synchronization of components of the transfer case assembly 16 associated with the secondary drive line 30 are also readily achieved in this operating mode.

By further or continuing energization of the shift control motor 100, the second fork assembly 286 may be moved to a third, right-most position wherein the clutch operating collar 270 and specifically the external splines or gear teeth 284 engage the internal splines or gear teeth 248 on the circular drive plate 242. Drive torque and energy from the primary output shaft 60 is provided through the drive hub 252, through the clutch collar 260 and through the clutch operating collar 270 to the circular drive plate 242. The drive plate 242 is coupled directly to the chain drive sprocket 160 through the bell housing 230. In this operating mode, the primary output shaft 60 and the chain drive sprocket 160 are locked together thereby providing a nominal fifty-fifty torque split to the primary drive line 20 and the secondary drive line 30.

It will be appreciated that the single shift control motor 100 drives, through the drive shaft 102, both the first fork assembly 116 and the second fork assembly 286 As such, the cam 108 and the helical tracks 112 and 292 command motion of the first fork assembly 116 and the second fork assembly 286 in a defined and fixed sequence. The preferred sequence is as follows and defines three distinct operational modes or combinations of the foregoing individual modes of operation of the planetary gear assembly 48 and the electromagnetic clutch assembly 120. These three operational modes are designated 2H (two-wheel drive, high gear); AH (adaptive drive, high gear) and 4H (four-wheel drive, low gear) and correspond to operator selectable switches or push buttons on the driver input control 44 illustrated in FIG. 1.

In a first operating position, the first fork assembly 116 and the dog clutch 90 as well as the second fork assembly 286 and the clutch operating collar 270 are in their left-most positions as illustrated in FIGS. 2, 3 and 4. So positioned, the dog clutch 90 provides direct or high gear operation and the clutch operating collar 270 renders the electromagnetic clutch assembly 120 and specifically the disc pack assembly 200 fully disconnected from the chain drive sprocket 160 and the secondary drive line 30. As noted above, this operating mode reduces inter-drive line drag and friction which would otherwise occur.

In a second operating position, the helical cam track 112 includes a dwell region thereby maintaining the dog clutch 90 in the direct or high gear operating mode while the second fork assembly 286 moves the clutch operating collar 270 and specifically the clutch collar 260 to its middle position wherein the clutch collar 260 bridges and connects the drive hub 252 with the annular drive collar 208, thus coupling the primary output shaft 60 to the annular drive collar 208. In this operating mode, activation of the electromagnetic clutch assembly 120 may occur and provide controlled, i.e., modulated, transfer of torque from the primary output shaft 60 to the chain drive sprocket 160 and the associated secondary drive line 30.

Attainment of the third operating position entails motion of both the first fork assembly 116 and the associated dog clutch 90 and the second fork assembly 286 and the clutch operating collar 270 as commanded by the shift control motor 100 and the helical cam tracks 112 and 292. These components move to the left-most positions such that the dog clutch 90 engages the internal gear teeth 86 on the carrier 84 to provide a reduced speed drive to the primary output shaft 60 and the clutch operating collar 270 and the clutch collar 260 lock the primary output shaft 60 through the circular drive plate 242 and the bell housing 230 to the chain drive sprocket 160 and the secondary drive line 30. In this mode, the transfer case assembly 16 is operating in low gear and the two drive lines are coupled or locked together through the clutch assembly 120.

It should be noted that additional operating and clutch sequences may be readily achieved by the placement of suitable helical and dwell regions in the cam tracks 112 and 292. For example, a dwell region in the helical track 292 may be accompanied by a corresponding reverse helical region in the track 112 such that the dog clutch 90 moves to its intermediate or neutral position whereby the primary output shaft 60 is fully disconnected from the input shaft 60. Alternatively, a second electric shift control motor may be utilized to independently drive a second cam and an associated follower such that the dog clutch 90 and the clutch operating collar 270 may be fully independently positioned.

Returning to FIGS. 1 and 2, the drive chain 190 is received upon the chain drive sprocket 160 and engages and transfers rotational energy to a driven chain sprocket 300. The driven sprocket 300 is coupled to a secondary (front) output shaft 302 of the transfer case assembly 16 by interengaging splines 304. The secondary output shaft 302 is rotatably supported on a pair of anti-friction bearings such as ball bearing assemblies 306. The secondary output shaft 302 includes a flange 308 which may be integrally formed with or secured to the shaft 302 and which may be a portion of one of the universal joints 42. Similarly, the primary output shaft 60 may include a threaded or splined region 312 which receives a flange 314 which may be a portion of one of the universal joints 42. The flange 314 may be retained by a nut or similar fastener 316. A plurality of oil seals 318 are preferably located about each of the shafts 50, 60 and 302 as they exit the housing 46.

The transfer case assembly 16 may also include a first Hall effect sensor 320 having an output line 322 which is disposed in proximate, sensing relationship with a plurality of teeth 324 on a tone wheel 326 which is coupled to and rotates with the primary (rear) output shaft 60. A second Hall effect sensor 330 has an output line 332 and is disposed in proximate, sensing relationship with a plurality of teeth 334 of a tone wheel 336 disposed adjacent the driven chain sprocket 300 on the secondary output shaft 302.

Preferably, the number of teeth 324 on the tone wheel 326 is identical to the number of teeth 334 on the tone wheel 336 so that identical shaft speeds result in the same number of pulses per unit time from the Hall effect sensors 320 and 330. This simplifies computations relating to shaft speeds and improves the accuracy of all logic decisions based on such data and computations. As to the actual number of teeth 324 on the tone wheel 326 and teeth 334 on the tone wheel 336, it may vary from thirty to forty teeth or more or fewer depending upon rotational speeds and sensor construction. The use of thirty-five teeth on the tone wheels 326 and 336 has provided good results with the Hall effect sensors 320 and 330 and is therefore presently preferred.

The first and second Hall effect sensors 320 and 330 sense the respective adjacent teeth 324 and 334 and provide a series of pulses in the lines 322 and 332, respectively, which may be utilized to compute the instantaneous rotational speeds of the primary output shaft 60 and the secondary output shaft 302 which, of course, correspond to the rotational speeds and the rear drive shaft 22 and the front drive shaft 32, respectively.

It will be appreciated that other sensing devices such as, for example, variable reluctance sensors may be utilized. Such sensors do not, however, provide the clean wave form provided by Hall effect sensors, particularly at low shaft speeds, and thus may require extra input conditioning to provide useable data. It should also be appreciated that the Hall effect sensors 320 and 330 and their respective adjacent teeth 324 and 334 are preferably located within the housing 46 of the transfer case assembly 16 but may be located at any convenient site along the primary and secondary drive lines 20 and 30, respectively.

The foregoing disclosure is the best mode devised by the inventor for practicing this invention. It is apparent, however, that apparatus incorporating modifications and variations will be obvious to one skilled in the art of transfer case clutch assemblies. Inasmuch as the foregoing disclosure presents the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

I claim:

1. A clutch assembly for a motor vehicle drive line comprising, in combination,
   a primary drive member,
   an output member freely rotatably disposed on said primary drive member and defining first and second ends,
   an electromagnetic clutch operator disposed adjacent said first end of said output member,
   a disc pack assembly disposed adjacent said second end of said output member and having an input member adapted to be driven by said primary drive member and an output coupled to said output member, and
   a plurality of actuating members extending between said electromagnetic clutch operator and said disc pack assembly.

2. The clutch assembly of claim 1 further including a speed reduction assembly having a selectable output adapted to drive said primary drive member.

3. The clutch assembly of claim 1 further including a control clutch for selectively coupling neither or one of said input member and said output of said disc pack assembly to said primary drive member.

4. The clutch assembly of claim 3 further including a shift operator assembly for engaging said selectable output of said speed reduction assembly and translating said control clutch.

5. The clutch assembly of claim 1 wherein said output member is a chain drive sprocket and further including a chain, a driven chain sprocket and a secondary drive member coupled to said driven chain sprocket.

6. The clutch assembly of claim 1 wherein said disc pack assembly includes a first plurality of clutch discs operably coupled to said input member and a second plurality of clutch discs interleaved with said first plurality of clutch discs and operably coupled to said output member.

7. The clutch assembly of claim 1 wherein said clutch collar drivingly engages said primary drive shaft and includes a first member selectively engageable with said input member of said disc pack assembly and a second member selectively engageable with said output of said disc pack assembly.

8. A transfer case for providing torque to a primary drive line and a secondary drive line of a motor vehicle comprising, in combination,
   a primary output shaft,
   a secondary output member freely rotatably disposed on said primary output shaft and having two ends,
   an electromagnetic clutch operator disposed proximate one of said ends of said output member,
   a disc pack assembly disposed adjacent another of said ends of said output member and having an input member, a first plurality of clutch plates coupled to said input member, an output member coupled to said secondary output member and second plurality of clutch plates interleaved with said first plurality of clutch plates,
   a plurality of actuating members extending from said electromagnetic clutch operator to said disc pack assembly, and
   a clutch member for selectively coupling said primary output shaft to neither or one of said input member of said disc pack assembly and said output member of said disc pack assembly.

9. The transfer case of claim 8 further including a speed reduction assembly having a reduced speed output adapted to drive said primary output shaft.

10. The transfer case of claim 9 further including a shift operator assembly for translating said control clutch and selecting said reduced speed output of said speed reduction assembly.

11. The transfer case of claim 8 wherein said output member is a chain drive sprocket and further including a chain, a driven chain sprocket and a secondary output shaft coupled to said driven chain sprocket.

12. The transfer case of claim 8 wherein said disc pack assembly includes a first plurality of clutch discs operably coupled to said input member and a second plurality of clutch discs interleaved with said first plurality of clutch discs and operably coupled to said output member.

13. The transfer case of claim 8 wherein said clutch member is drivingly engaged by said primary output shaft and includes a first member selectively engageable with said input member of said disc pack assembly and a second member selectively engageable with said output of said disc pack assembly.

14. The transfer case of claim 13 further including a compression spring disposed between said first member and said second member of said clutch collar.

15. The transfer case of claim 13 wherein said plurality of actuating members extend through said secondary output member.

16. A torque delivery system for a motor vehicle comprising, in combination,
    a primary drive line,
    a secondary drive line,
    a transfer case having a primary output shaft adapted to drive said primary drive line and a secondary output shaft adapted to drive said secondary drive line, a chain drive sprocket freely rotatably disposed on said primary output shaft and defining spaced apart ends,
    a clutch operator disposed adjacent one of said ends of chain drive sprocket,
    a disc pack clutch assembly disposed adjacent another of said ends of said chain drive sprocket, having an input member and having an output member operably coupled to said chain drive sprocket,
    a plurality of members extending from said clutch operator to said disc pack clutch assembly, and
    a clutch collar for selectively, fully disconnecting or operably coupling one of said input member and said output of said disc pack clutch assembly to said primary drive shaft.

17. The torque delivery system of claim 16 wherein said disc pack assembly includes a first plurality of clutch discs operably coupled to said input member and a second plurality of clutch discs interleaved with said first plurality of clutch discs and operably coupled to said output member.

18. The torque delivery system of claim 16 further including a speed reduction assembly having a reduced speed output adapted to drive said primary output shaft.

19. The torque delivery system of claim 18 further including a shift operator assembly for translating said control clutch and selecting a reduced speed output of said speed reduction assembly.

20. The torque delivery system of claim 16 wherein said clutch collar is drivingly engaged by said primary output shaft and includes a first member selectively engageable with said input member of said disc pack assembly and a second member selectively engageable with said output of said disc pack assembly.

* * * * *